(12) United States Patent
Saulsbery et al.

(10) Patent No.: US 7,150,839 B1
(45) Date of Patent: Dec. 19, 2006

(54) FLUORESCENT AGENTS

(75) Inventors: Robin L. Saulsbery, Allentown, PA (US); Matthew Frederick Slozer, Whitehall, PA (US)

(73) Assignee: Minerals Technologies Inc., New York, NY (US)

( * ) Notice: Subject to any disclaimer, the term of this patent is extended or adjusted under 35 U.S.C. 154(b) by 0 days.

(21) Appl. No.: 10/221,548

(22) PCT Filed: Dec. 29, 1999

(86) PCT No.: PCT/US99/31137

§ 371 (c)(1),
(2), (4) Date: Sep. 12, 2002

(87) PCT Pub. No.: WO01/49934

PCT Pub. Date: Jul. 12, 2001

(51) Int. Cl.
*D21H 21/30* (2006.01)
*C09K 11/02* (2006.01)
*C09K 11/06* (2006.01)
*C09K 11/08* (2006.01)
*C09K 11/55* (2006.01)
*C09K 11/54* (2006.01)

(52) U.S. Cl. .......................... 252/301.16; 252/301.35; 252/301.34; 106/501.1; 106/429; 106/471; 106/505; 106/215.1; 106/217.7; 162/135; 162/162; 162/158; 162/175; 162/181.4; 524/47; 524/56; 524/58; 524/433; 524/401; 524/432

(58) Field of Classification Search .......... 252/301.16, 252/301.21, 301.4 R, 301.6 R, 301.22
See application file for complete search history.

(56) References Cited

U.S. PATENT DOCUMENTS

| | | |
|---|---|---|
| 3,915,884 A | 10/1975 | Kazenas |
| 4,119,521 A | 10/1978 | Chirikjian |
| 4,777,034 A * | 10/1988 | Olivier et al. ................ 424/65 |
| 4,780,376 A | 10/1988 | Nakamura |
| 4,975,220 A | 12/1990 | Streitel et al. |
| 5,003,182 A | 3/1991 | Umemoto et al. |
| 5,229,161 A | 7/1993 | Turk |
| 5,464,651 A | 11/1995 | Turk et al. |

FOREIGN PATENT DOCUMENTS

| | | |
|---|---|---|
| JP | SHO 63-256484 | 4/1987 |
| JP | 06145582 A | 5/1994 |
| JP | 8302269 A2 | 11/1996 |
| JP | 11-005769 | 7/2000 |

OTHER PUBLICATIONS

Search report from PCT application upon which this case is based.*
"Room-Temperature Phosphorescence of Amorphous Metal Complexes of Aliphatic Carboxylic Acids with Basic Amino Acids" Turk; Dulebohn; Vail. *Chemistry of Materials*, 1995, pp. 385-390.

* cited by examiner

*Primary Examiner*—C. Melissa Koslow
(74) *Attorney, Agent, or Firm*—Leon Nigohosian, Jr.; George H. Fairchild

(57) ABSTRACT

Composition comprising a fluorescent material comprising the mixture of one or more metal salts selected from the group consisting of metal oxides and metal hydroxides; one or more carbohydrate(s) selected from the group consisting of sugar and starch; and one or more organic acid(s), method of preparation comprising mixing the components in the presence of water and then drying, and use of the fluorescent material in paper, plastic, polymer, resin, and paint. The resultant papers, plastics, polymers, resins, and paint have whiteness and brightness due to the fluorescence.

16 Claims, No Drawings

FLUORESCENT AGENTS

BACKGROUND OF THE INVENTION

This invention relates to fluorescent materials useful in paper, paint, plastic, resin, and polymers. This invention also relates to methods of preparing the materials, to paper, paint, plastic, resin, and polymers comprising the materials.

Fluorescent materials are usually large non-saturated aromatic molecules such as stilbene, or inorganic solids consisting of a metal cation, a nonmetal cation, a nonmetal anion, and an activate or some type. Activators are usually rare earth or transition metals which, when added to these compounds in small amounts, e.g., 0.1 percent to 5 percent, can alter wavelength of the emitted light.

Organic based fluorescent compounds are called "optical brightening agents" (OBA) or "fluorescent whitening agents" (FWA), and are typically added in with filler and/or comprise part of the coating formulation in finer grades of paper, and as filler pigments in paints, polymers, plastics, resins. Such FWA and OBA's fluoresce at around 450 nm or in the blue violet region of the electromagnetic spectrum, and their use counteracts the natural yellow coloration of cellulose fibers, plastics, and paint bases so as to cause the treated substance to appear whiter and brighter.

FWA's used in papermaking also require quenching during white water recycling in order to maintain even fluorescence on the paper, which adds cost to the process. Furthermore, food grade papers can not be made on paper machines where FWA's have been previously used, unless the machine is thoroughly cleaned, which causes expense, downtime, and other problems.

Therefore, in the paper field, as well as in the fields of plastics, resins, polymers, and paint, there is a need for fluorescent materials which can be used as fillers and coating materials.

SUMMARY OF THE INVENTION

These needs, and others which will become apparent from the following disclosure, are addressed by the present invention which comprises in one aspect a composition comprising a fluorescent material comprising a mixture of one or more metal compound(s) selected from metal oxides and metal hydroxides; one or more carbohydrate compound(s) selected from sugars and starches; and one or more organic acids.

In another aspect, the invention comprises paper filled or coated with the fluorescent material. The invention also comprises polymer, paint, resin, plastic, or other material comprising the fluorescent material.

In still another aspect, the invention comprises a method of preparing a fluorescent material comprising mixing in water one or more metal compound(s) selected from the group consisting of metal oxide(s) and metal hydroxide(s) wherein the metal compound(s) comprise from about 11 percent to about 67 percent by weight of the fluorescent material, one or more carbohydrate(s) selected from the group consisting of sugar(s) and starch(es) wherein the carbohydrate(s) comprise from about 1 percent to about 67 percent by weight of the fluorescent material, and one or more organic acid(s), comprising from about 11 percent to about 67 percent by weight of the fluorescent material to form a mixture; and drying the mixture into the fluorescent material in a particular form.

DETAILED DESCRIPTION OF THE INVENTION AND THE PREFERRED EMBODIMENTS

The fluorescent material of the invention, sometimes referred to herein as an FWA, can be used in all paper products, paperboard products or aseptic packaging. The fluorescent material can also be used in any composition or product where fluorescence is desirable, especially in polymers, plastics, resins, paints, coatings, and the like. The material can be added in the same manner as other pigments would be added to such compositions or products.

The fluorescent materials can be prepared, for example, by mixing the carbohydrate(s), the metal compound(s), the organic acid(s), and water and then drying to remove the water. For the purpose of this invention, fluorescent whitening agents are chemicals which absorb light in the ultraviolet region and reemit it in the visible blue range giving a fluorescent whitening effect. The composition of the FWA's is obtained by mixing preferably from about 1 percent to about 67 percent carbohydrate(s), from about 11 percent to about 67 percent metal compound(s), and from about 11 percent to about 67 percent organic acid(s). All percentages herein are dry weight percentages.

When the carbohydrate is one or more forms of sugar, the sugar(s) can be first dissolved in warm water at a concentration of from about 2.5 percent to about 8 percent by weight of solution of sugar and water. Sucrose is the preferred form of sugar, but other forms can be used instead or in combination with the sucrose. The preferred, most preferred, and most preferred ratio ranges of sugar(s) to metal compound(s) to organic acid(s) are from about 30 percent to about 67 percent, more preferably from about 40 percent to about 60 percent, and most preferably about 50 percent sugar(s); from about 15 percent to about 35 percent, more preferably from about 20 percent to about 30 percent, and most preferably about 25 percent of metal compound(s), and from about 10 percent to about 35 percent, more preferably from about 20 percent to about 30 percent, and most preferably about 25 percent of organic acid(s).

When the carbohydrate is one or more forms of starch, the starch is cooked, preferably at a concentration of from about 1 percent to 1.5 percent by weight, followed by mixing with the other ingredients. The preferred, more preferred, and most preferred ratios of starch(es) to metal compound(s) to organic acid(s) are from about 3 percent to about 20 percent, more preferably from about 3 percent to about 10 percent, and most preferably about 4 percent starch(es); from about 30 percent to about 60 percent, more preferably from about 40 percent to about 35 percent, and most preferably about 48 percent of metal compound(s); and from about 30 percent to about 60 percent, more preferably from about 40 percent to about 55 percent, and most preferably about 48 percent of organic acid(s). Non-limiting examples of preferred starches are cationic corn starch, ethylated starch, potato starch, amphoteric starch, modified starch and the like.

The metal compound is preferably a metal oxide or metal hydroxide. The metal ion of the metal oxide or hydroxide can be zinc, magnesium, calcium, sodium, potassium, and the like. Zinc oxide is preferred. Other non-limiting examples of these compounds include, magnesium hydroxide, calcium oxide, sodium hydroxide, and potassium hydroxide. The metal oxide or hydroxide is usually added before the organic acid.

The organic acid can be an unsaturated acid or an aromatic acid with the aromatic acid being preferred. Non-limiting examples of aromatic acids include salicyclic, phthalic, isophthalic, terephthalic acids, and the like. The most preferred aromatic acid is salicyclic.

The fluorescent material is preferably removed from solution by drying.

The fluorescent material is very useful as a whitening agent. Addition to paint, plastics, or resin as a filler or pigment or coating, and especially to paper as a filler or coating results in improvements to such materials with respect to whitening and usability in food contact applications. The fluorescence wavelength of the materials varies, but is preferably in the range of from about 400 nanometers (nm) to about 470 nm range, more preferably in the range of from about 430 nm to about 440 nm range, which is most suitable for compensating for the natural yellowness of paper and other materials.

When used in paper, the fluorescent material can be added or applied to paper in the same manner as other fillers and coatings. The fluorescent material imparts brightness to the paper sheets while reducing the need for conventional paper mineral filler and coatings. The fluorescent material can be added instead of, or in combination with, conventional fillers such as precipitated calcium carbonate (PCC), ground calcium carbonate (GCC), clay, and the like.

When used in paints, plastics, and resins, the material is added in the same manner as conventional fillers or pigments, but the material of the invention causes fluorescence and increases the brightness and reflectance of the resulting paint, polymer, plastic, or resin. The fluorescent material can be added instead of, or in combination with, conventional fillers such as PCC, GCC, clay, and the like.

EXAMPLES

The following non-limiting examples are presented to illustrate a few embodiments of the invention. All parts and percentages are by dry weight unless otherwise noted.

Example 1

Sucrose, zinc oxide, and salicylic acid were added, in order, to a small amount of warm deionized water, stirred for about five minutes, and then poured into a watch glass, followed by oven drying at 110 degrees Celcius. The dry samples were measured for fluorescence using a Hitachi F-450 fluorescence spectrophotometer by placing a sample in a sample holder and obtaining a contour plot of excitation wavelength versus emission wavelength, and then using the graph to determine the peak excitation wavelength for obtaining intensity vs. emission wavelength spectra. The wavelength of the maximum emission is reported in Table 1.

TABLE 1

| Sucrose (parts) | Zinc oxide (parts) | Salicylic acid (parts) | Peak Emission Wavelength, (nm) |
|---|---|---|---|
| 6 | 2 | 1 | 438 |
| 2 | 2 | 1 | 434 |
| 3 | 2 | 1 | 425 |
| 3.6 | 2 | 1 | 430 |
| 2.6 | 2 | 1 | 432 |
| 4 | 4 | 1 | 412 |
| 4 | 1 | 1 | 411 |
| 2 | 1 | 1 | 432 |
| 4 | 2 | 1 | 436 |
| 8 | 4 | 1 | 385 |
| 5 | 2.5 | 1 | 429 |
| 2.5 | 1.25 | 1 | 434 |

Altering the ratio of sugar/metal oxide/and organic acid changes the peak emission wave length and therefore the fluorescence of the material.

Example 2

This fluorescent material was added either alone or in combination with PCC to paper pulp. The pulp was bleached northern kraft, co-refined at 1.6 percent consistency to an endpoint of 400 Canadian Standard Freeness. Alkyl Ketene Dimer sizing (Hercon® 75 AKD, Hercules, Inc.) and anionic polyacrylamide retention aid (Reten® 1523 Hercules Inc.) were added to the furnish at rates of 0.25 percent and 0.0125 percent, respectively. Aliquots were taken from each batch to form four 75 grams per meter squared (g/m$^2$) conditioned handsheets. The handsheets were formed, pressed at 20 pounds per square inch (psi), and dried on a Formax sheet former, and then measured for fluorescence using the spectrophotometer and method described in Example 1, with the results shown in Table 2.

TABLE 2

| Filler | Peak Emission Wavelength, (nm) | Peak Emission Intensity |
|---|---|---|
| None (control) | 416 | 309 |
| FWA, 10% (invention) | 415 | 1974 |
| 10% FWA, 10% PCC (invention) | 415 | 2308 |
| PCC | 469 | 284 |

Handsheets containing FWA display increased fluorescence compared to non-FWA containing sheets. While the invention has been described and exemplified in detail, various modifications, alternative, and improvements should become readily apparent to those skilled in the art without departing from the spirit and scope of the invention.

What is claimed is:

1. A fluorescent material comprising a mixture of:
one or more metal compound(s) selected from the group consisting of zinc oxide, magnesium oxide, calcium oxide, sodium hydroxide, and potassium hydroxide, wherein the metal compound(s) comprise from about 11 percent to about 67 percent by weight of the fluorescent material;
one or more carbohydrate(s) selected from the group consisting of sugar(s), corn starch, potato starch, amphoteric starch, ethylated starch and modified starches, wherein the carbohydrate(s) comprise from about 1 percent to about 67 percent by weight of the fluorescent material; and
one or more organic acid(s) selected from the group consisting of salicylic acid, phthalic acid, isophthalic acid, and terephthalic acid, wherein the organic acid(s) comprise from about 11 percent to about 67 percent by weight of the fluorescent material.

2. The fluorescent material of claim 1, wherein the organic acid is salicylic acid, the metal compound is zinc oxide, and the carbohydrate(s) are selected from the group consisting of sugar(s), corn starch, potato starch, amphoteric starch, ethylated starch and modified starches.

3. The fluorescent of claim 1, wherein the carbohydrate(s) are one or more starch(es) selected from the group consisting of corn starch, potato starch, amphoteric starch, ethylated starch and modified starches, and wherein the metal compound(s) are from about 30 percent to about 60 percent by weight of the fluorescent material;

the starch(es) are from about 3 percent to about 20 percent by weight of the fluorescent material; and the organic acid(s) are from about 30 percent to about 60 percent by weight of the fluorescent material.

4. The fluorescent material of claim 1, wherein the carbohydrate(s) are one or more sugar(s), and wherein the metal compound(s) are from about 15 percent to about 35 percent by weight of the fluorescent material;

the sugar(s) are from about 30 percent to about 67 percent by weight of the fluorescent material; and the organic acid(s) are from about 10 percent to about 35 percent by weight of the fluorescent material.

5. The fluorescent material of claim 1, wherein the carbohydrate(s) are one or more starch(es) selected from the group consisting of corn starch, potato starch, amphoteric starch, ethylated starch and modified starches, and wherein the metal compound(s) are from about 40 percent to about 55 percent by weight of the fluorescent material;

the starch(es) are from about 3 percent to about 10 percent by weight of the fluorescent material; and the organic acid(s) are from about 40 percent to about 55 percent by weight of the fluorescent material.

6. The fluorescent material of claim 1, wherein the carbohydrate(s) are one or more sugar(s), wherein the metal compound(s) are from about 20 percent to about 30 percent by weight of the fluorescent material;

the sugar(s) are from about 40 percent to about 60 percent by weight of the fluorescent material; and the organic acid(s) are from about 20 percent to about 30 percent by weight of the fluorescent material.

7. The fluorescent material of claim 1, wherein the carbohydrate(s) are one or more starch(es) selected from the group consisting of corn starch, potato starch, amphoteric starch, ethylated starch and modified starches, and wherein the metal compound(s) are about 48 percent by weight of the fluorescent material;

the starch(es) are about 4 percent by weight of the fluorescent material; and the organic acid(s) are about 48 percent by weight of the fluorescent material.

8. The fluorescent material of claim 1, wherein the carbohydrate(s) are one or more sugar(s), and wherein the metal compound(s) are about 25 percent by weight of the fluorescent material;

the sugar(s) are about 50 percent by weight of the fluorescent material; and the organic acid(s) are about 25 percent by weight of the fluorescent material.

9. The fluorescent material of claim 1, wherein the carbohydrate is sucrose, the organic acid is salicylic acid and the metal compound is zinc oxide.

10. The fluorescent material of claim 1, wherein the carbohydrate is starch, the organic acid is salicylic acid and the metal compound is zinc oxide.

11. A paper comprising the fluorescent material of claim 1 as a filler.

12. A paint comprising the fluorescent material of claim 1 as a pigment.

13. A method of preparing a fluorescent material comprising:

mixing in water one or more metal compound(s) selected from the group consisting of metal oxide(s) and metal hydroxide(s) wherein the metal compound(s) comprise from about 11 percent to about 67 percent by weight of the fluorescent material, one or more carbohydrate(s) selected from the group consisting of sugar(s) and starch(es) wherein the carbohydrate(s) comprise from about 1 percent to about 67 percent by weight of the fluorescent material, and one or more organic acid(s), comprising from about 11 percent to about 67 percent by weight of the fluorescent material to form a mixture; and drying the mixture into the fluorescent material in a particular form.

14. A paper comprising the fluorescent material of claim 1 as a coating material.

15. A plastic comprising the fluorescent material of claim 1 as a filler.

16. A resin comprising the fluorescent material of claim 1 as a filler.

* * * * *